FIG. 2
FIG. 3
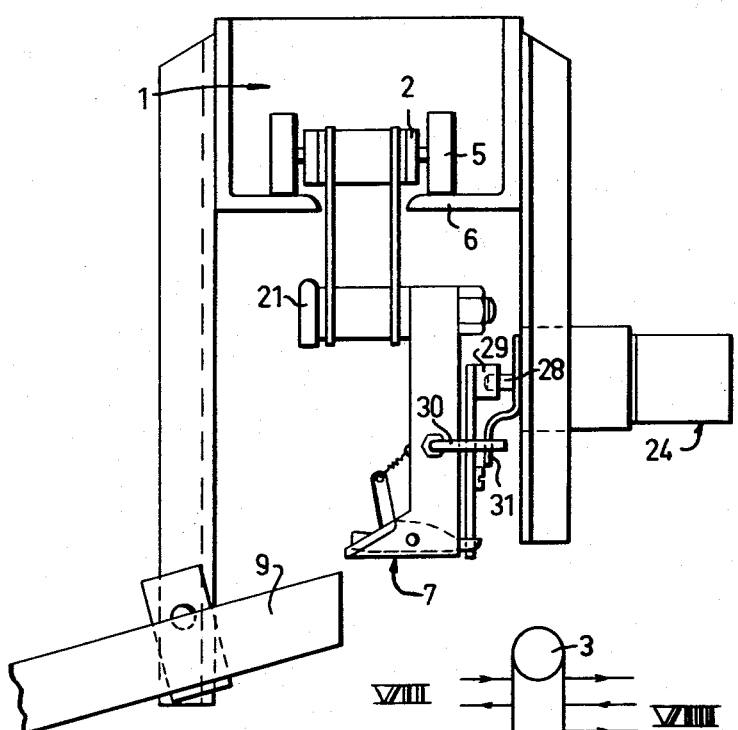
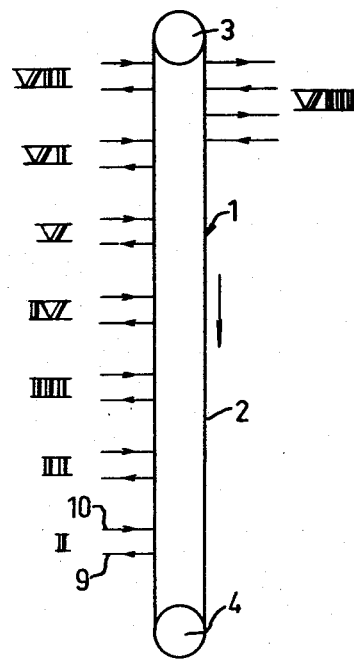

Nov. 14, 1961   O. ÖHRNELL   3,008,562
CONVEYING SYSTEM

Filed Sept. 23, 1958   3 Sheets-Sheet 3

United States Patent Office 3,008,562
Patented Nov. 14, 1961

3,008,562
CONVEYING SYSTEM

Olof Öhrnell, Torgilsgatan 17B, Boras, Sweden
Filed Sept. 23, 1958, Ser. No. 762,795
Claims priority, application Sweden Sept. 25, 1957
4 Claims. (Cl. 198—26)

This invention relates to a conveying system for use in continuous manufacture of industrial products that are treated and/or assembled stepwise in a number of working stations spaced along a continuously driven endless overhead conveyor. The conveying system is primarily intended for use in the ready-made-clothing industry to transport the articles after their assembly, during which the conveying device according to U.S. Patent No. 2,866,-533 should preferably be used, to the final finishing operations on the articles. Consequently, the conveying system suggested according to the present invention will primarily serve such purposes where there is no possibility of redirecting the articles to other equivalent machines.

The essentially characteristic features of conveying system according to the invention are that the industrial products to be conveyed are secured to suspension means which are hooked onto hook means depending from the overhead conveyor, that each working station comprises two bars for receiving and delivering the suspension means to the overhead conveyor, the receiving bars being inclined downwardly from the level of the hook means of the overhead conveyor while the delivery bars are inclined downwardly toward said level, and that the conveying system incorporates means for automatically moving the suspension means onto and down from the hook means of the overhead conveyor at the various working stations.

Further features of the invention will become apparent from the following description, reference being had to the accompanying drawings illustrating by way of example an embodiment of the conveying system. In the drawings:

FIG. 2 is a cross section of the overhead conveyor with a receiving bar as seen from the side;

FIG. 3 is a diagrammatic plan view of the conveying system;

Figure 1:
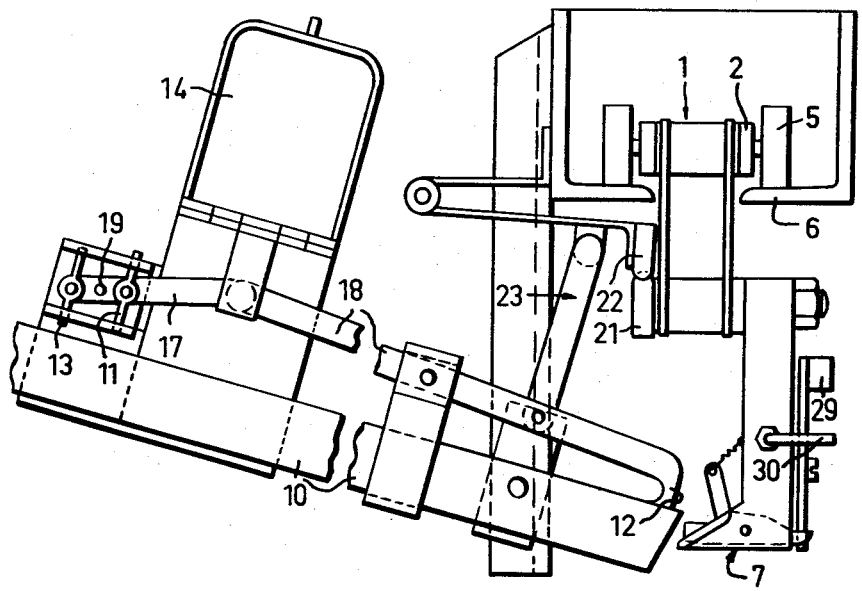
FIG. 1 is a cross section of the overhead conveyor with a delivery bar as seen from the side.
Figure 4:
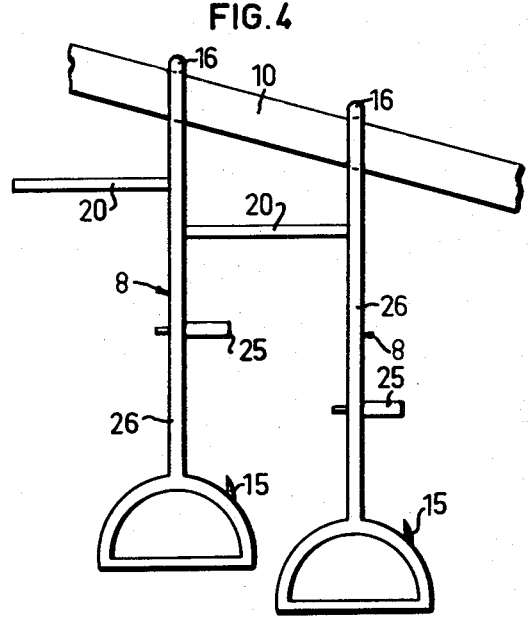
FIG. 4 is a front view of two suspension means mounted on a delivery bar.
Figure 5:
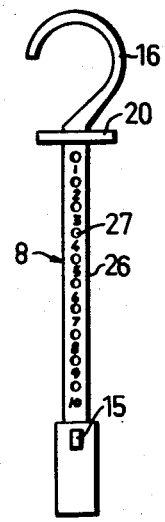
FIG. 5 is a side elevation of a suspension means.

In the drawings, 1 designates the overhead conveyor comprising an endless chain 2 passing over two sprocket wheels 3 and 4, at least one of which is driven. The chain 2 is supported by wheels 5 rolling on the beam flanges 6 and is provided at spaced intervals with hook means 7 for suspension means 8 from which for instance three articles can be suspended with the aid of clotheshangers or the like. Other objects also, such as crates and the like, can be secured to the suspension means 8, the shape of which is of course dependent on the object to be conveyed.

According to FIG. 3, the conveying system includes seven working stations I—VII and a separate receiving station VIII. Each working station I—VII includes a receiving bar 9 and a delivery bar 10. The receiving bars 9 are inclined downwardly from the level of the hook means 7 of the overhead conveyor 1 so that the suspension means 8 on said hook means tend to slide by gravity from the conveyor 1 to end stop means on the bars 9. The delivery bars 10 are inclined downwardly toward said level so that the suspension means 8 on said bars tend to slide by gravity toward the conveyor 1 whereby they can be caused to engage the hook means 7 thereof.

According to FIG. 1, the delivery bar 10 is provided with not less than three ratchets 11, 12 and 13 for the suspension means 8, said ratchets being released by the hook means 7 of the overhead conveyor 1 when they pass the delivery bar 10, the arrangement being such that a release is produced only when the hook means 7 are not supporting any suspension means 8.

The ratchet 11 is adapted to be released by an electromagnet 14 or the like. Said electromagnet 14 obtains its releasing impulse somewhat before the hook means 7 of the overhead conveyor 1 passes the delivery bar 10. This arrangement has been made because the overhead conveyor 1 is provided somewhat ahead of the delivery bar 10 in question with a contact means which is adapted to be actuated by the hook means 7 proper. Said actuation will have no effect in the event that the hook means 7 has a suspension means 8, for this suspension means also is adapted to actuate a contact means. The latter contact means is connected in series with the first contact means, the circuit for the first contact means being opened by the second contact means when the latter is actuated by a suspension means 8 on the hook means 7.

The ratchet 12 which is provided with a mechanical release mechanism is arranged at the end of the delivery bar 10 which is situated adjacent the path of the hook means 7. The ratchet 12 is connected with the ratchet 11 in such a way that one of said ratchets will occupy a locking position when the other is released and vice versa. Upon release of the ratchet 11 so that the suspension means 8 can slide toward the end of the bar 10, the ratchet 12 occupies a locking position. The ratchet 12 thus stops the movement of the suspension means 8 in immediate proximity to the end of the bar 10. The suspension means 8 is also provided with one or more projections 15 which in said position are adapted to engage with a snap spring or the like so that the suspension means 8 will not pendulate in said position. Just when the hook means 7 is opposite the bar 10 the ratchet 12 is released so that the suspension means 8 falls from the bar 10, engaging by means of its hook 16 the hook means 7 of the overhead conveyor 1 for the transport of the suspension means 8 to the next working station. Upon release of the ratchet 12, the ratchet 11 again occupies its locking position because the ratchets 11 and 12 are connected, each via one lever 17 and 18, to the electromagnet 14.

The ratchet 11 is located on one side of the centre of pivotment 19 of the lever 17 while the ratchet 13 is located on the other side of said centre 19. It is hereby assured that one of the ratchets 11 and 13 is in locking position when the other is released. The arrangement of the ratchets 11 and 13 assures that only one suspension means 8 at a time slides down the bar 10 to the ratchet 12 when the ratchet 11 is released, for the distance between the ratchets 11 and 13 is equal to or smaller than the distance between two suspension means 8. Said distance between the suspension means 8 is preferably determined by distance members 20 arranged on said suspension means and so located as to engage with the adjacent suspension means 8 when these are disposed on the delivery or receiving bars 9 and 10.

For the release of the ratchet 12 each hook means 7 has a projecting portion 21 in the form of a ball bearing or the like which is to engage with a cam 22 that is adapted, through a link system 23, to raise the lever 18, which has its outer end facing away from the electromagnet 14 and so designed as to form the ratchet 12.

Opposite each receiving bar 9 the conveying system is provided with a preferably electrically releasable release mechanism 24. The release of said mechanism 24 is dependent on the position of adjustment of a plug 25 or the like on the suspension means 8. In a preferred embodiment, the suspension means 8 includes a vertical shank 26 in which a row of vertically spaced-apart holes 27 is provided, which correspond to the various working stations I—VII. These holes 27 are adapted to receive the plugs 25.

When a plug 25 is inserted in a hole 27 at the same level as the contact means of the release mechanism 24 which is preferably equipped with an electromagnet, said mechanism obtains an impulse so that a projection 28 will extend into the path of a projecting portion 29 on the hook means 7, which is adapted to release said hook means 7 so that the suspension means 8 thereon is delivered to the corresponding receiving bar 9. Furthermore, the hook means 7 are provided with a second projecting portion 30 which by the intermediary of a pivoting arm 31 is adapted to move aside the projection 28 after the hook means 7 has been released. By the action of a spring or the like the pivoting arm 31 exerts a pressure on the projection 28 so that when said projection 28 is moved into the path of said projecting portion 29, said lever 31 engages in a recess in said projection 28, thus locking the same in this extreme position. Said locking is thus cancelled by means of the second projecting portion 30.

According to an important feature the receiving bar 9 cooperates with a switch which, when the bar 9 is filled completely with suspension means 8, is adapted to open the circuit to the electrically releasable release mechanism 24 so that no further suspension means 8 is released at the full receiving bar 9. The switch at said receiving bar 9 is connected in series with the switch of the release mechanism 24. The sensing means of the switch at the receiving bar 9 may to advantage be adapted to engage the hook 16 of the last suspension means 8.

According to the embodiment shown, the receiving station VIII is provided with three receiving bars 9 and one delivery bar. For each of these receiving bars 9 there is at least one contact device corresponding to one of the working stations and which is thus adapted to be actuated by the corresponding plug 25. In this case, the receiving bar 9 is thus intended for such suspension means 8 which the worker at the working station in question has not been able to receive because said station is full. In a preferred embodiment, the contact device is connected in series with a switch at the receiving bar 9 at the corresponding working station or stations so that the release mechanism at the bars 9 of the receiving station VIII is releasable only when the current to the release mechanisms 24 of the corresponding receiving bar and/or bars is open. When a receiving bar 9 at a working station therefore is full, a suspension means 8 dispatched to said station will pass the same and be received instead at the receiving station VIII. However, if the bar 9 is not full when the suspension means 8 arrives in the receiving station VIII, it will pass said receiving station, and it is therefore possible that when it arrives at said bar 9 next time it will be received by it. According as the work proceeds at the various working stations the suspension means 8 are shifted from the receiving bars 9 to the delivery bars 10, the plugs 25 being simultaneously shifted in their holes 27.

The receiving station VIII preferably includes also receiving bars 9 for the finished articles. These, however, can also be received at some working station. At the receiving station VIII it is easily checked whether any working station is not able to perform the intended tasks, and it is therefore possible to resort to the adjustments required.

The receiving bar 9 of a working station may very well constitute the delivery bar 10 for another overhead conveyor 1 which may be located in another story than the first conveyor 1.

While the invention has been described in a preferred embodiment with reference to the drawings it is understood that the invention is not restricted to this very embodiment, and many modifications may therefore be resorted to within the scope of the appendant claims.

What I claim and desire to secure by Letters Patent is:

1. A mechanism for delivering a work suspension means to a carrier carried by a power-driven endless conveyor, said carrier comprising a hook adapted to support said work suspension means, comprising a delivery bar adapted to slidingly support said work suspension means, said bar being inclined downwardly with its lower end adjacent to and at the level of said hook as the latter passes said bar, ratchet means normally retaining said work suspension means on said bar, means normally actuated by said carrier as it passes said bar for actuating said ratchet means to release said work suspension means to cause it to slide by gravity onto said hook, and means preventing said carrier from actuating said ratchet means when another work suspension means is supported by said hook.

2. A mechanism for delivering a work suspension means to a carrier carried by a power-driven endless conveyor, said carrier comprising a hook adapted to support said work suspension means, comprising a delivery bar adapted to slidingly support said work suspension means, said bar being inclined downwardly with its lower end adjacent to and at the level of said hook as the latter passes said bar, a first ratchet for retaining said work suspension means on said bar in a first position spaced from its lower end and a second ratchet for retaining said work suspension means on said bar in a second position at its lower end, a first release means for releasing said first ratchet, said first release means being normally actuated by said carrier before said hook comes abreast said bar to cause said work suspension means to slide by gravity from said first to said second position, and a second release means actuated by said carrier as said hook comes abreast said bar for releasing said second ratchet to cause said work suspension means to slide by gravity onto said hook.

3. A mechanism as defined by claim 2 comprising means preventing said carrier from actuating said first ratchet when another work suspension means is supported by said hook.

4. A mechanism as defined by claim 2, comprising a third ratchet adjacent said bar and spaced from said first ratchet a distance less than the closest spacing between adjacent work suspension means supported by said bar, said first and third ratchets being linked together and operated by said first release means so that only one of them can be in released position at the same time, whereby only one work suspension means can be released at a time to slide down said bar from said first to said second position.

References Cited in the file of this patent

UNITED STATES PATENTS

| | | |
|---|---|---|
| 1,645,315 | Bixler et al. | Oct. 11, 1927 |
| 2,318,180 | Morse | May 4, 1943 |
| 2,872,057 | Wagner et al. | Feb. 3, 1959 |